US012722703B2

(12) United States Patent
Yang et al.

(10) Patent No.: US 12,722,703 B2
(45) Date of Patent: Sep. 1, 2026

(54) DEVICE FOR REINFORCING A REAR AXLE OF A VEHICLE, IN PARTICULAR A MOTOR VEHICLE

(71) Applicant: STELLANTIS AUTO SAS, Poissy (FR)

(72) Inventors: Lu Yang, Velizy Villacoublay (FR); Stephane Fonfrede, Belfort (FR); Marc Peru, Chatenay Malabry (FR); Matthieu Chermat, Ermont (FR); Marie Dominique Le Blay, Bonnelles (FR)

(73) Assignee: Stellantis Auto SAS, Poissy (FR)

( * ) Notice: Subject to any disclaimer, the term of this patent is extended or adjusted under 35 U.S.C. 154(b) by 178 days.

(21) Appl. No.: 18/559,202

(22) PCT Filed: Mar. 23, 2022

(86) PCT No.: PCT/FR2022/050533

§ 371 (c)(1),
(2) Date: Nov. 6, 2023

(87) PCT Pub. No.: WO2022/243613

PCT Pub. Date: Nov. 24, 2022

(65) Prior Publication Data

US 2024/0246609 A1 Jul. 25, 2024

(30) Foreign Application Priority Data

May 20, 2021 (FR) ...................................... 2105257

(51) Int. Cl.
*B62D 21/11* (2006.01)
*B60K 13/04* (2006.01)
(Continued)

(52) U.S. Cl.
CPC .............. *B62D 21/11* (2013.01); *B60K 13/04* (2013.01); *B60K 15/063* (2013.01);
(Continued)

(58) Field of Classification Search
CPC .. B62D 21/11; B62D 21/155; B62D 25/2027; B60K 15/063; B60K 6/26; B60Y 2200/92
See application file for complete search history.

(56) References Cited

U.S. PATENT DOCUMENTS 8,579,307 B2 * 11/2013 Buschjohann ........... B62D 3/12 280/124.109
8,590,908 B2 * 11/2013 Kroger .................. B62D 21/11 280/124.109

(Continued)

FOREIGN PATENT DOCUMENTS

FR 2955077 B1 4/2012
FR 3011800 B1 4/2015

(Continued)

OTHER PUBLICATIONS

International Search Report for PCT/FR2022/050533 mailed on Jun. 28, 2022.
Written Opinion for PCT/FR2022/050533 mailed on Jun. 28, 2022.

*Primary Examiner* — Erez Gurari
(74) *Attorney, Agent, or Firm* — Sandberg Phoenix & von Gontard, PC

(57) ABSTRACT

The invention relates in particular to a device for reinforcing a rear axle of a vehicle, which comprises an electric motor and a fuel tank having a concavity able to provide passage for an exhaust pipe. The vehicle comprises a vehicle floor. The reinforcing device comprises a cradle (5) having two arms (50, 51) between which the electric motor can be received. The device further comprises an elongate reinforcing element (6) which extends in a direction perpendicular to the two arms (50, 51) from one (50) of the two arms in
(Continued)

the center thereof, the elongate reinforcing element (6) being able to extend above the floor of the vehicle and in the concavity of the fuel tank, the elongate reinforcing element having an element length and a receiving housing which extends over the entire element length to provide passage for the exhaust pipe.

10 Claims, 5 Drawing Sheets

(51) Int. Cl.

| | |
|---|---|
| ***B60K 15/063*** | (2006.01) |
| ***B62D 21/15*** | (2006.01) |
| ***B62D 25/20*** | (2006.01) |
| *B60K 6/26* | (2007.10) |

(52) U.S. Cl.

CPC ....... *B62D 21/155* (2013.01); *B62D 25/2027* (2013.01); *B60K 6/26* (2013.01); *B60Y 2200/92* (2013.01)

(56) References Cited

U.S. PATENT DOCUMENTS

| | | | | |
|---|---|---|---|---|
| 8,925,942 | B2 * | 1/2015 | Buschjohann | B62D 29/005 280/124.109 |
| 9,045,170 | B2 * | 6/2015 | Rumpel | B62D 25/08 |
| 12,084,111 | B2 * | 9/2024 | Merulla | B62D 27/065 |
| 12,403,756 | B2 * | 9/2025 | Vreede | B60G 9/025 |
| 2012/0319375 | A1 * | 12/2012 | Uhlenbruch | B62D 3/12 280/93.502 |
| 2019/0276093 | A1 | 9/2019 | Tatsuwaki et al. | |
| 2021/0139078 | A1 * | 5/2021 | Peru | B60K 15/063 |
| 2023/0192196 | A1 * | 6/2023 | Gonda | B62D 25/2027 296/204 |
| 2024/0246609 | A1 * | 7/2024 | Yang | B62D 21/155 |
| 2025/0050726 | A1 * | 2/2025 | Barillot | B60K 1/02 |

FOREIGN PATENT DOCUMENTS

| | | | |
|---|---|---|---|
| JP | 2010247622 | A | 11/2010 |
| WO | 2011135221 | A1 | 11/2011 |

* cited by examiner

[Fig. 1]
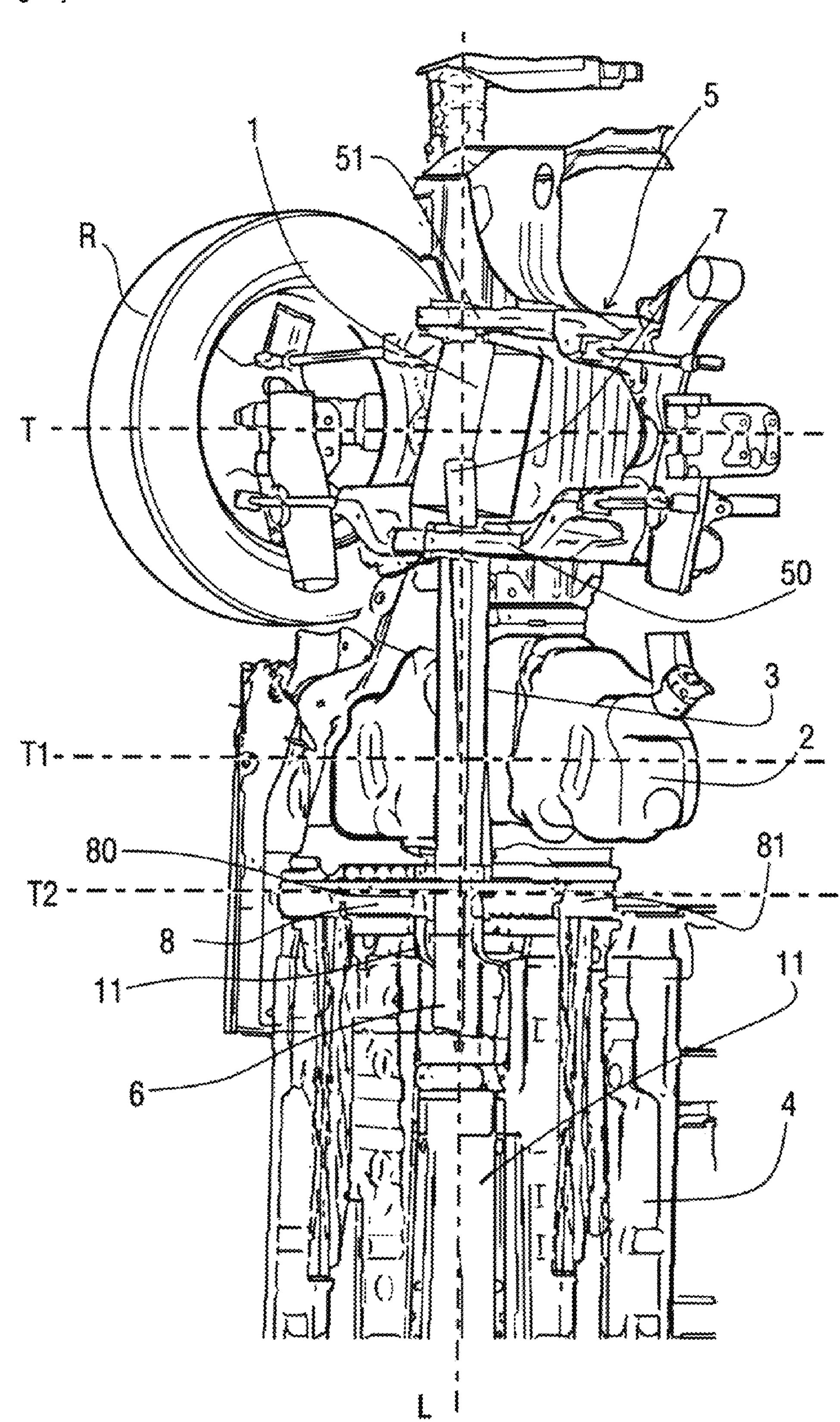

[Fig. 2]
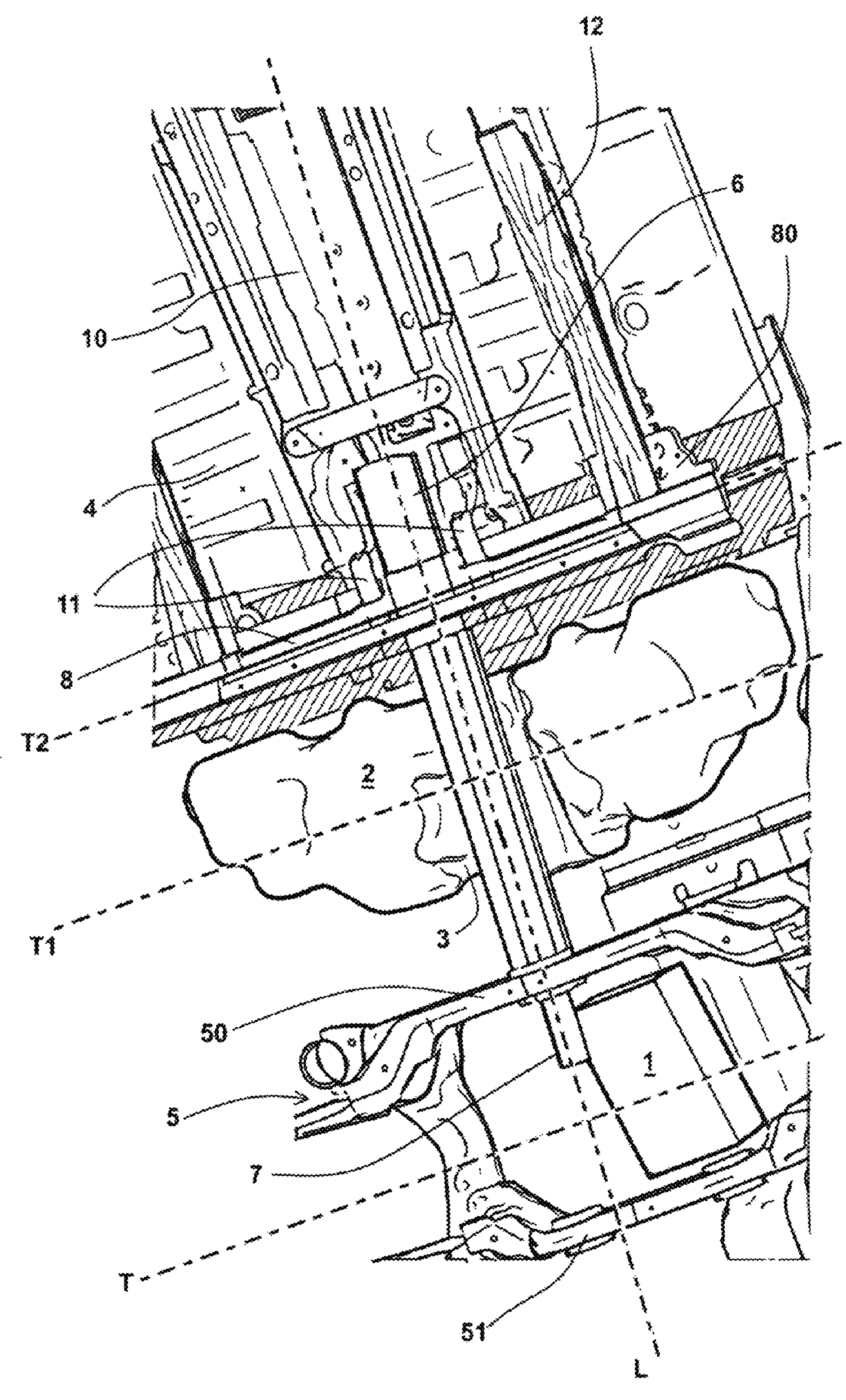

[Fig. 3]
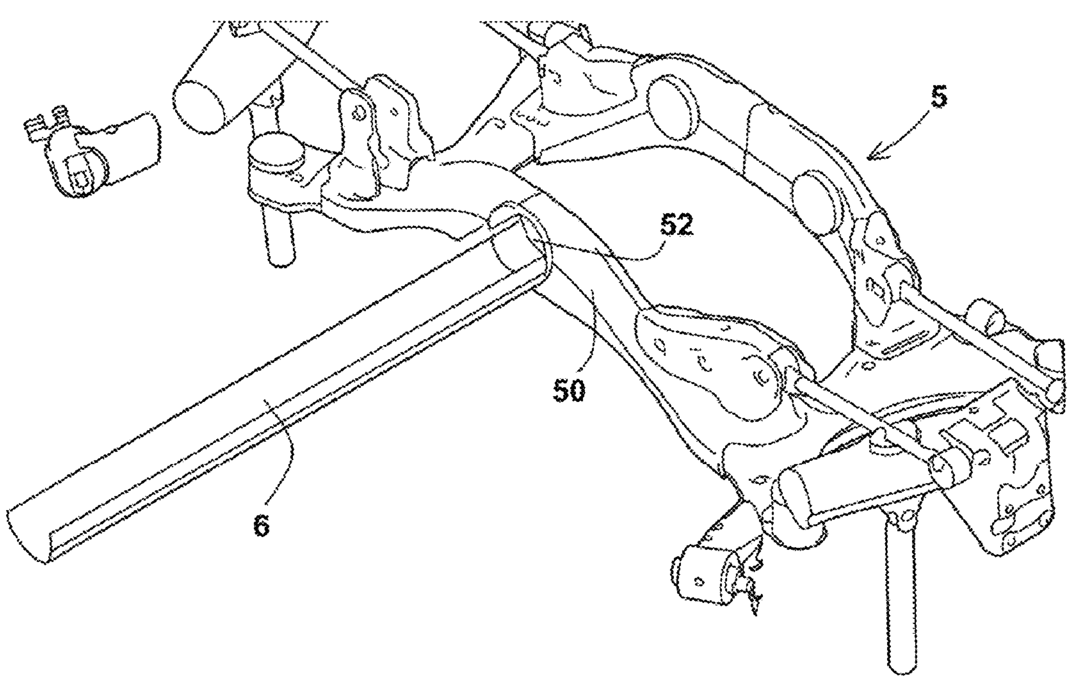
[Fig. 4]
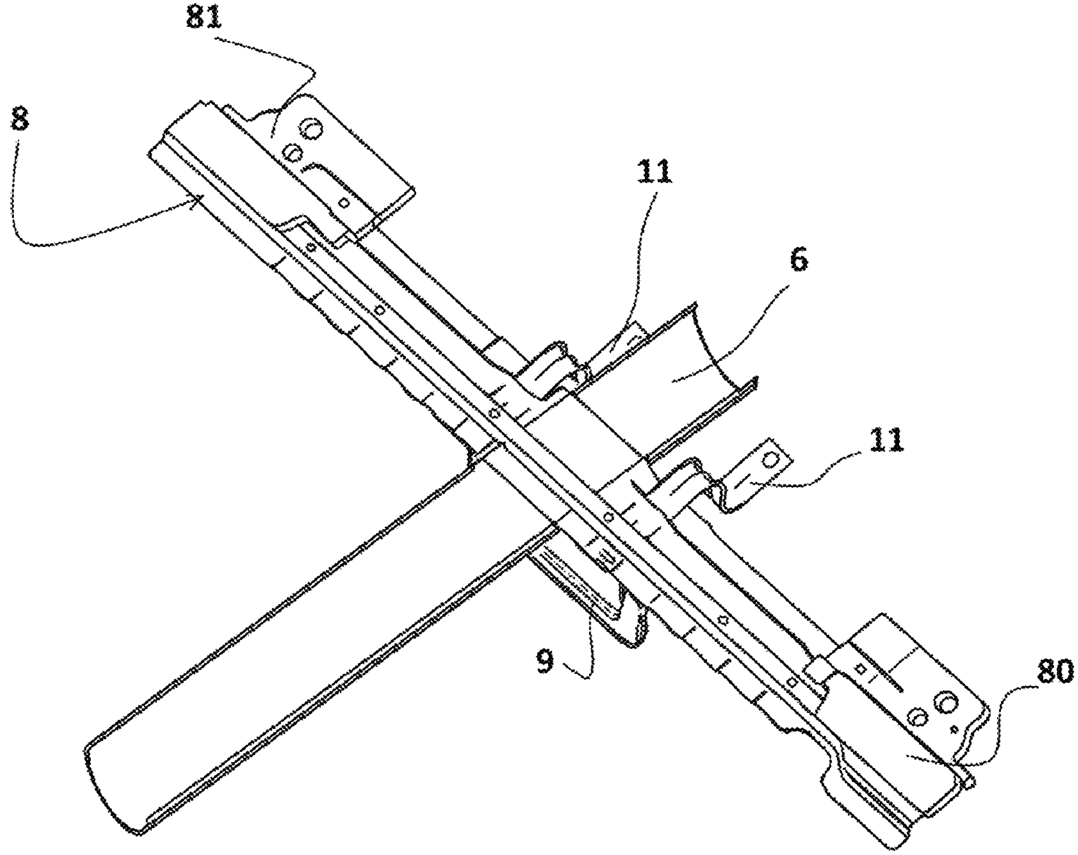

[Fig. 5]
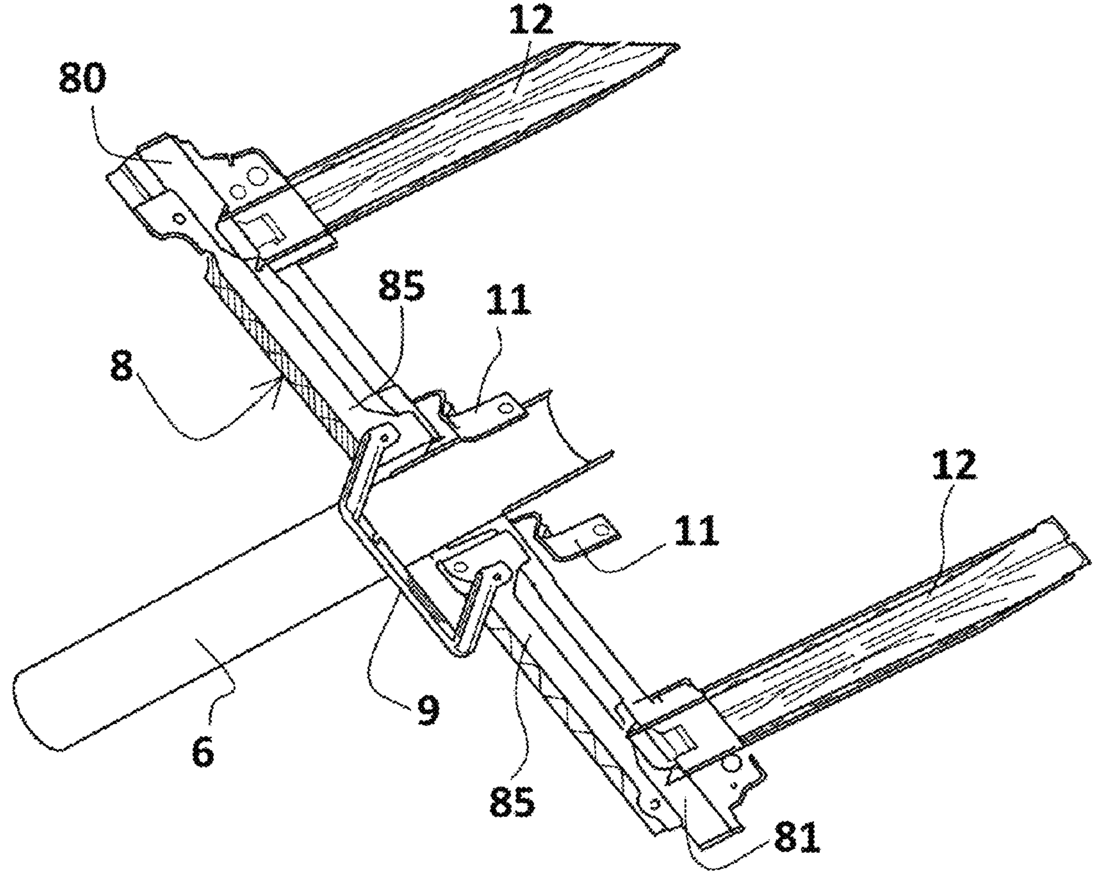
[Fig. 6]
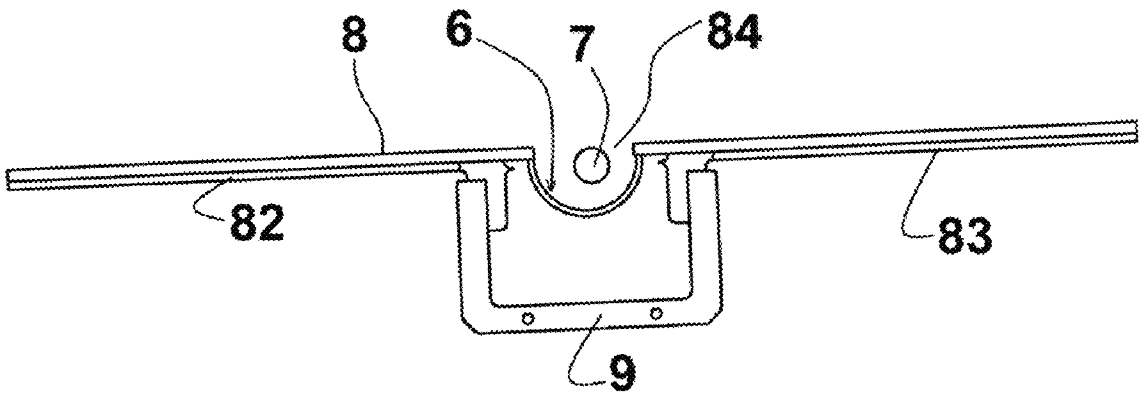

[Fig. 7]
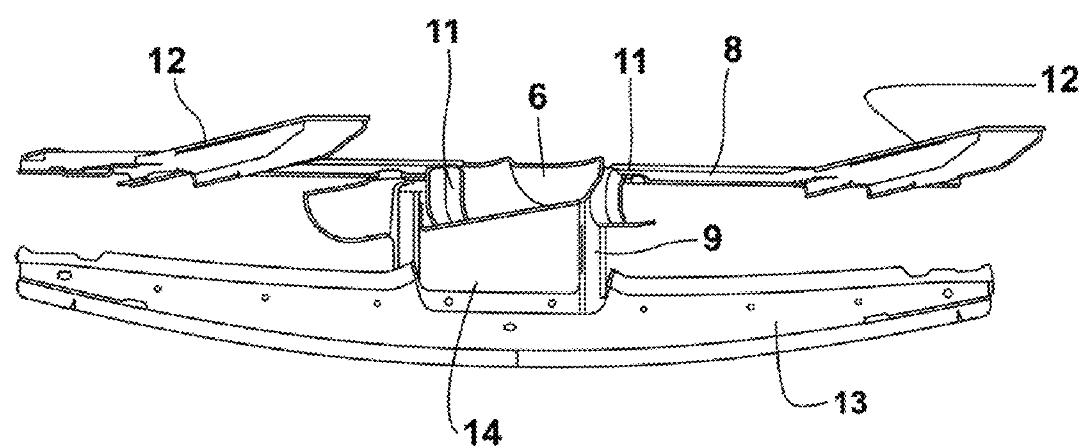

DEVICE FOR REINFORCING A REAR AXLE OF A VEHICLE, IN PARTICULAR A MOTOR VEHICLE

CROSS-REFERENCE TO RELATED APPLICATIONS

This application is the US National Stage under 35 USC § 371 of International Application No. PCT/FR2022/050533, filed Mar. 23, 2022, which claims the priority of French application 2105257 filed on May 20, 2021, the content (text, drawings and claims) of both said applications being incorporated by reference herein.

BACKGROUND

The devices described herein relate to the field of the automotive industry. More particularly, they relate to a device for reinforcing a vehicle rear axle, in particular a motor vehicle, to protect a fuel tank in the event of a rear collision.

Some hybrid vehicles comprise an electric motor (or electric machine) located at the rear of the vehicle.

This electric motor is secured in a protective cradle placed near the fuel tank.

In the event of a rear collision on such a motor vehicle, the cradle does not bend to protect the electric motor, and the energy of the collision is transmitted to the elements of the vehicle which are rigidly connected to the cradle. However, there remains a risk that the fuel tank will be impacted at the end of the collision.

SUMMARY

The described devices aim to further control the transmission of the energy caused by the collision in order to avoid any impact between the cradle and the fuel tank.

A chassis structure for a thermal or electric motor vehicle is known from document FR3011800 which aims to control the forces due to a front collision of the vehicle so that the chassis has a capacity to better absorb the impacts without deforming. To do this, the chassis structure comprises a rigid metal cross between two adjacent cross-members.

Also known from document FR2955077 is another technical solution aiming to control the forces in the event of a front collision, which consists of providing an elongate reinforcing element near the tunnel of the vehicle, which tunnel is provided in particular to house the battery.

The solutions presented in these documents are not designed to control the forces in the event of a rear collision of the vehicle.

The described devices therefore aim to propose a solution that is implemented at the rear of hybrid vehicles whose electric motor is received in a cradle.

Also related is a device for reinforcing a rear axle of a vehicle, in particular a motor vehicle, said vehicle rear axle comprising an electric motor and a fuel tank comprising a concavity able to provide passage for an exhaust pipe and which extends in a longitudinal direction of the vehicle, said vehicle comprising a vehicle floor, said reinforcing device comprising a cradle having two arms between which said electric motor can be received. The reinforcing device is remarkable in that it comprises an elongate reinforcing element which extends in a direction perpendicular to the two arms from one of the two arms in the center thereof, the elongate reinforcing element being able to extend above the floor of the vehicle and in the concavity of the fuel tank, the elongate reinforcing element having an element length and a receiving housing which extends over the entire element length to provide passage for the exhaust pipe.

In the event of an impact, the presence of the elongate reinforcing element makes it possible to discharge the thrust onto the rear axle of the vehicle by directing the forces towards the floor.

In addition, the elongate reinforcing element makes it possible to stiffen the survival space of the fuel tank, while maintaining the volume of the vehicle dedicated to receiving the fuel tank (the space allotted for the tank is not modified).

Also described is an additional solution to existing vehicles which comprises a rear secondary drive, providing additional protection making it possible to secure the fuel tank.

This solution is also compatible with the conversion of an already-existing rear platform/synthesis and makes it possible to reduce the rear overhang.

The reinforcing device may also comprise the following characteristics:

- the elongate reinforcing element may be a hollow half-tube. According to other alternative embodiments, an elongate reinforcing element may be provided comprising a hollow tube, with a circular, or polygonal or other cross-section;
- said elongate reinforcing element can be made of the same piece as said cradle. According to another variant, it may also comprise two distinct elements (elongate cradle and reinforcing element), subsequently joined together, for example by spot welding.

Also related is a vehicle, in particular a motor vehicle, comprising a vehicle rear axle comprising an electric motor and a fuel tank having a concavity capable of providing passage for an exhaust pipe, said concavity extending in a longitudinal direction of the vehicle, said vehicle comprising a vehicle floor and a cradle for protecting said electric motor, said cradle comprising two arms which each extend in a direction transverse to said longitudinal direction of said vehicle, said electric motor being received between said two arms of the cradle. The vehicle is remarkable in that it comprises a reinforcing device as defined above, comprising said elongate reinforcing element which is received in said concavity of said reservoir and which extends up to above said floor, said elongate reinforcing element receiving said exhaust pipe.

It should be noted that the passage of the reinforcing element does not reduce the volume of the fuel tank because the latter is already designed to provide passage for the exhaust pipe of the vehicle.

Furthermore, the elongate reinforcing element braces the center of the rear axle (being associated with the center of one arm of the cradle), which is the most effective place to limit its retraction in the event of a rear impact of the vehicle.

The vehicle may also comprise the following features, taken separately or in combination (based on various reinforcing levels that it is desired to provide to a vehicle):

- the vehicle may comprise a reinforcing cross-member that extends in a direction transverse to said longitudinal direction of said vehicle, said cross-member being attached to said vehicle floor and comprising at its center a U-shaped reinforcing clip, surrounding said elongate reinforcing element at the inlet of a tunnel provided in said floor, said cross-member further comprising at least one fastening tab in said tunnel,
- the cross-member may comprise a continuous central part that extends above said clip, or, in one variant, the cross-member may comprise two aligned parts separated by a central space, said two aligned parts being connected by said clip, said cross-member may comprise at least one reinforcement base which extends at least partially on one face of said cross-member, the vehicle may comprise at least two reinforcement bars on said floor which each extend in a direction parallel to the longitudinal direction of said vehicle from the ends of said cross-member, the vehicle may also comprise a heel plate and a reinforcement for bearing on said heel plate, said bearing reinforcement comprising a cut-out to at least partially accommodate said clip.

BRIEF DESCRIPTION OF THE FIGURES

Other advantages and features will become apparent from examining the detailed description of an embodiment that is in no way limiting, and the appended drawings, wherein:

FIG. 1 is a perspective view showing certain elements of a vehicle rear axle, comprising a reinforcing device.

FIG. 2 is a bird's-eye view showing certain elements shown in FIG. 1, seen from another angle.

FIG. 3 is a perspective view of a reinforcing device, shown alone.

FIG. 4 is a top-down and perspective view of an element of the device shown in FIG. 3, associated with another vehicle element.

FIG. 5 is a bottom-up and perspective view of an element of the device shown in FIG. 4, associated with a third element of the vehicle.

FIG. 6 is a schematic view of an alternative embodiment of the additional element shown in FIG. 4.

FIG. 7 is a perspective and side view of yet another element that a vehicle can comprise.

DETAILED DESCRIPTION

FIG. 1 shows certain elements of a rear axle of a motor vehicle, the motor vehicle being an electric or hybrid vehicle.

FIG. 1 shows a right rear wheel R and elements located substantially at wheel height, such as the floor or fuel tank.

The vehicle extends in a longitudinal direction L.

The axis of the wheels of the vehicle extends in a transverse direction T, intersecting the longitudinal direction L and, in the example shown, and in particular concerning the axis of the wheels, the transverse direction T is perpendicular or substantially perpendicular to the longitudinal direction L.

The vehicle rear axle comprises an electric motor 1 (or electric machine) and a fuel tank 2.

The electric motor 1 is positioned between the rear wheels.

To describe the elements shown in FIG. 1, the left part of the figure is defined as being the front part and the right part of the figure as the rear part. An element placed in front of a second element will therefore be shown on the left of the second element in FIG. 1.

Thus, the fuel tank 2 is positioned in front of the electric motor 1 (and thus before the electric motor) in FIG. 1.

The fuel tank 2 has an elongate shape, which extends along a transverse direction T1. It comprises, on the top, a concavity 3 which extends in a direction parallel to the longitudinal direction L of the vehicle.

This concavity 3 is able to provide passage for an exhaust pipe (reference 7 in FIG. 1), that is to say that the concavity is sufficiently wide and sufficiently deep to accommodate the exhaust pipe.

The vehicle further comprises a vehicle floor 4, visible in FIGS. 1 and 2. The floor 4 is located in front of the fuel tank 2.

Behind the fuel tank 2, between the two rear wheels R, the vehicle comprises a reinforcing device making it possible both to protect the electric motor 1 in the event of a rear impact of the vehicle, and to protect the fuel tank; the reinforcing device thus comprises a cradle 5 which comprises two cradle arms 50 and 51, the two arms 50 and 51 extending substantially in planes oriented along transverse directions and substantially parallel to one another.

The electric motor 1 is received in the cradle 5, between the two arms 50 and 51.

The reinforcing device further comprises an elongate reinforcing element 6 which extends in the longitudinal direction L of the vehicle, perpendicular to the two arms 50 and 51 of the cradle 5.

In FIGS. 1 and 2, it can be seen that the elongate reinforcing element 6 extends above the tank 2, in the concavity 3 of said fuel tank 2, and also above the floor 4.

The elongate reinforcing element 6 is a hollow half-tube that can be seen in particular in FIG. 3. However, the elongate reinforcing element 6 could have another shape without departing from the scope of the present description: it could comprise a hollow tubular element, with a round, polygonal or other cross-section (that is to say any kind, or a shape complementary to another, etc.), provided that it makes it possible to accommodate the vehicle exhaust pipe 7: indeed, the fuel tank concavity existed before to allow the passage of the exhaust pipe. Thus, the elongate reinforcing element makes it possible to maintain the position of the exhaust pipe.

The elongate reinforcing element 6 of the reinforcing device thus comprises a receiving housing able to provide passage for the exhaust pipe 7.

The elongate reinforcing element thus makes it possible to orient the forces generated by a rear impact towards the floor, above the reservoir but not on the reservoir so as to preserve it.

The elongate reinforcing element 6 made in a half-tube facilitates the introduction of said exhaust pipe 7.

In the context of the presented embodiment, the elongate reinforcing element 6 can be made of the same piece as said cradle. It could also be created independently of the cradle 5 and rigidly connected after striking on the cradle 5.

More precisely, as shown in FIG. 3, the front arm 50 of the cradle 5 comprises, substantially in its middle (that is to say in its middle or approximately in its middle), a through-opening 52 of cylindrical shape, through which the end of the exhaust pipe can pass.

The opening 52 can accommodate one end of the elongate reinforcing element 6 or the end of the elongate reinforcing element 6 can be rigidly connected at least partially around the opening 52 on the arm 50 of the cradle 5.

In one embodiment, and as shown in particular in FIGS. 2, 4 and 5, the vehicle further comprises a reinforcing cross-member 8, which extends in a transverse direction T2 relative to said longitudinal direction L of said vehicle and which is attached to the floor 4 of the vehicle.

The elongate reinforcing element 6 bears periodically on the cross-member 8, thus transmitting the force received by the reinforcing device during a rear impact of the vehicle.

The cross-member 8 may comprise a single transverse element that extends in a transverse direction T2 between two ends 80 and 81 of the cross-member (FIG. 4 or 5), or two parts of cross-members 82 and 83, which are aligned and separated by a central space 84 (FIG. 6).

According to the two embodiments, the cross-member 8 comprises a U-shaped reinforcing clip (reference 9), in the central part of the cross-member.

In the example where the cross-member 8 comprises a single transverse element (FIG. 4), a continuous central part extends above said U-shaped clip.

In the example where the cross-member 8 comprises two cross-member aligned parts 82 and 83, said clip 9 connects the two aligned parts.

The clip 9 of the cross-member 8 surrounds the elongate reinforcing element 6.

It also has another function: the floor 4 comprises a tunnel 10 (see FIG. 2) and the clip 9 is attached to the entrance of the tunnel 10 provided in said floor 4.

The cross-member 8 further comprises two fastening tabs 11 which are secured in said tunnel 10.

Each fastening tab 11 can be made of stamped or folded sheet metal.

The cross-member 8 can also be made of stamped or folded sheet metal. For example, it can be made of FB60 steel with a thickness of 1.5 mm.

The clip may be made of steel or a light alloy, with a thickness of 2 mm.

As shown in FIG. 5, the cross-member 8 may also comprise at least one reinforcement base 85 that extends at least partially on one face of said cross-member: in the context of the example shown in FIG. 5, the cross-member 8 comprises two bases that each extend on the face of the cross-member 8 that is oriented in the same direction as the clip 9 (namely, downwards so that the base 85 is clamped between the cross-member and the floor 4).

The base(s) may be made of DP780 steel with a thickness of 1.3 mm.

The vehicle may also comprise two reinforcement bars 12, which each extend in a direction parallel to the longitudinal direction of said vehicle from the ends of said cross-member (therefore perpendicularly to the cross-member 8) and which are also attached to said floor (for example, by spot welding).

As can be seen in FIG. 7, the bars 12 are, for example, produced by profiles whose section is U-shaped, which makes it possible to attach the bars to a protruding part of the floor of rectangular cross-section, called a stretcher.

Each bar could also comprise two associated elements, each being L-shaped.

The arms 12 are made of FB60 steel with a thickness of 2 mm.

The ends of the reinforcement bars 12 bear against or are attached to the ends 80 and 81 of the cross-member, so as to also dissipate the effects of any rear impact on the floor of the vehicle.

It is also provided to equip the vehicle with a support reinforcement 13 on a heel plate of the vehicle, in the case of a vehicle equipped with a heel plate (see FIG. 7), said support reinforcement 13 comprising a central cut-out 14 to at least partially accommodate the clip 9.

The invention claimed is:

1. A device for reinforcing a rear axle of a vehicle, in particular a motor vehicle, said vehicle rear axle comprising an electric motor and a fuel tank having a concavity able to provide passage for an exhaust pipe and which extends in a longitudinal direction of the vehicle, said vehicle comprising a vehicle floor, said reinforcing device comprising a cradle having two arms between which said electric motor can be received, wherein the reinforcing device comprises an elongate reinforcing element which extends In a direction perpendicular to the two arms from one of the two arms in the center thereof, said elongate reinforcing element being able to extend above said floor of said vehicle and in said concavity of said fuel tank, the elongate reinforcing element having an element length and a receiving housing which extends over the entire element length to provide passage for said exhaust pipe.

2. The device according to claim 1, wherein the elongate reinforcing element comprises a hollow half-tube.

3. The device according to claim 1, wherein said elongate reinforcing element is made of the same piece as said cradle.

4. A vehicle, in particular a motor vehicle, comprising a vehicle rear axle comprising an electric motor and a fuel tank having a concavity able to provide passage for an exhaust pipe, said concavity extending in a longitudinal direction of the vehicle, said vehicle comprising a vehicle floor and a cradle to protect said electric motor, said cradle having two arms which each extend in a direction transverse to said longitudinal direction of said vehicle, said electric motor being received between said two arms of the cradle, said vehicle comprising a reinforcing device according to claim 1, comprising said elongate reinforcing element which is received in said concavity of said fuel tank and which extends just above said floor, said elongate reinforcing element receiving said exhaust pipe.

5. The vehicle according to claim 4, wherein it comprises a reinforcing cross-member that extends in a direction transverse to said longitudinal direction of said vehicle, said cross-member being attached to said vehicle floor and comprising at its center a U-shaped reinforcing clip, surrounding said elongate reinforcing element at the inlet of a tunnel provided in said floor, said cross-member further comprising at least one fastening tab in said tunnel.

6. The vehicle according to claim 5, wherein said cross-member comprises a continuous central part which extends above said clip.

7. The vehicle according to claim 5, wherein said cross-member comprises two aligned parts separated by a central space, said two aligned parts being connected by said clip.

8. The vehicle according to claim 5, characterized in that wherein said cross-member comprises at least one reinforcement base that extends at least partially on one face of said cross-member.

9. The vehicle according to claim 5, characterized in that wherein it comprises at least two reinforcement bars on said floor which each extend in a direction parallel to the longitudinal direction of said vehicle from the ends of said cross-member.

10. The vehicle according to claim 5, comprising a heel plate, characterized in that wherein the vehicle comprises a reinforcement for bearing on said heel plate, said bearing reinforcement comprising a cut-out to at least partially accommodate said clip.

* * * * *